Jan. 6, 1931.  R. A. STOKES ET AL  1,788,352
METHOD OF AND APPARATUS FOR THE EVAPORATION OF LIQUIDS
Filed March 5, 1930  2 Sheets-Sheet 1

Jan. 6, 1931.  R. A. STOKES ET AL  1,788,352
METHOD OF AND APPARATUS FOR THE EVAPORATION OF LIQUIDS
Filed March 5, 1930  2 Sheets-Sheet 2
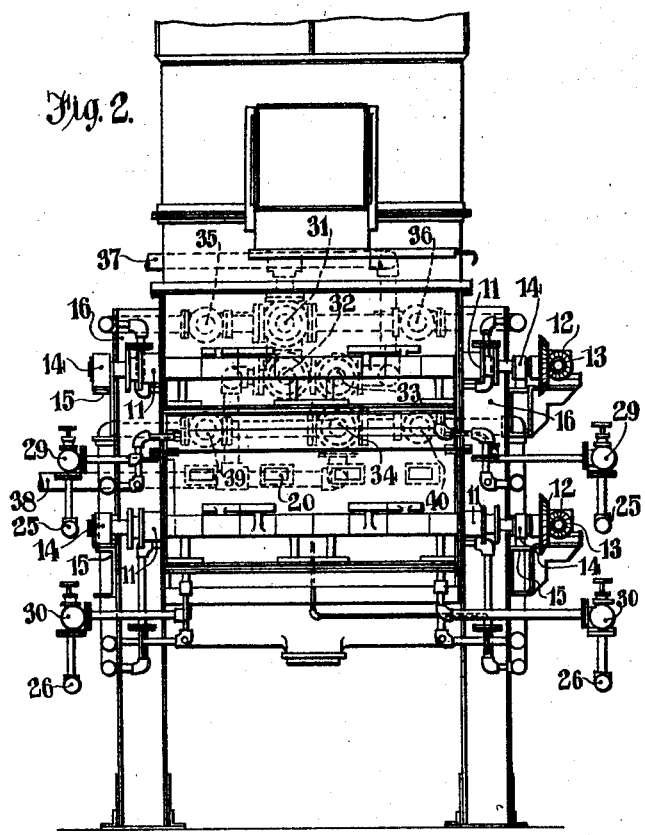
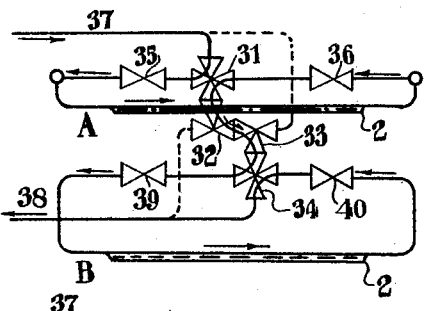
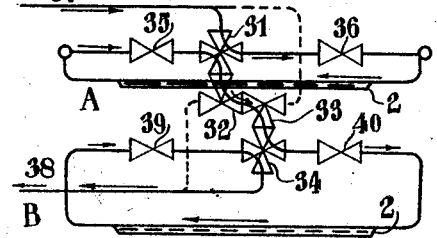

Patented Jan. 6, 1931

1,788,352

UNITED STATES PATENT OFFICE

RICHARD ALBERT STOKES AND EDWIN GILBERT LLEWELLYN ROBERTS, OF LONDON, ENGLAND, ASSIGNORS TO E. M. S. INDUSTRIAL PROCESSES LIMITED, OF LONDON, ENGLAND

METHOD OF AND APPARATUS FOR THE EVAPORATION OF LIQUIDS

Application filed March 5, 1930, Serial No. 433,425, and in Great Britain December 20, 1928.

In the specifications of Letters Patent No. Re. 17,251 and application for patent Serial No. 159,401, there is described a method of distilling or treating coal or similar carbonaceous materials by low temperature methods wherein the material is adapted to be fed laterally through a series of retorts or troughs located side by side in the same plane.

We have found that a similar method may be adopted for the evaporation of liquids, or the crystallization of salts from their solutions.

Accordingly the present invention consists in a method of evaporating liquids or crystallizing salts from their solutions, wherein the material is adapted to be passed transversely over a plurality of troughs or undulations and to be subjected during the whole or part of its passage thereover to an agitating or mixing action.

Other features of the invention will be apparent from the following description:—

In order that our invention may be more clearly understood and readily carried into practice a preferred form of apparatus for giving practical effect to the method set out above, will now be described with reference to the accompanying drawings, wherein:—

Fig. 2 is a transverse section of the apparatus shown in Fig. 1, and

Figs. 3 to 6 show diagrammatically various pipe circuits for the cooling water or other medium and forming part of the apparatus.

Figure 1:
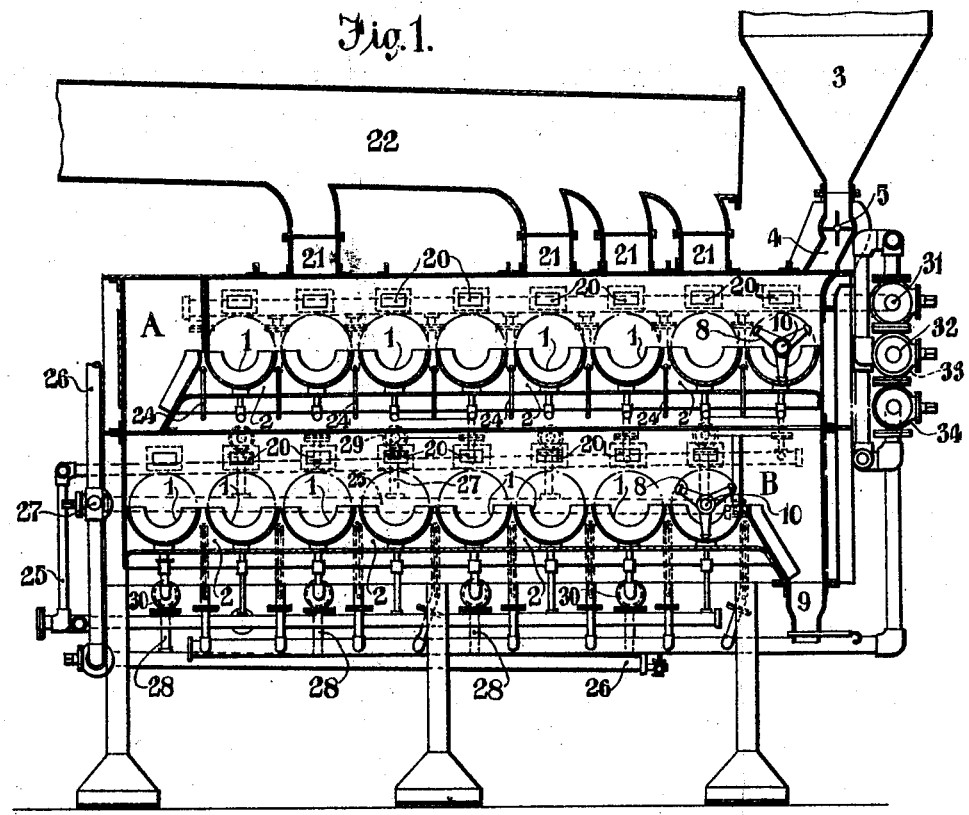
Fig. 1 shows a longitudinal section of a suitable apparatus.

Referring now to the drawings:

We form our improved drier or evaporator from a series of semicircular troughs 1 arranged side by side in continuous banks, and in transverse relation to the passage of the material through the apparatus, the troughs forming the upper plate of a closed vessel 2 which acts as a jacket for the heating or cooling medium.

In the arrangement shown the drier or evaporator comprises two tiers of troughs A and B located in an outer casing, the arrangement being such that the material is adapted to be fed from a hopper 3 connected by means of the shoot 4 through a distributor and seal 5 of any preferred construction to the first trough of the series from which the material passes through the troughs forming the first tier A from the end trough of which it overflows and drops down to the lower tier B, being conveyed therethrough by the action of paddles or stirrers 8 as will hereafter appear, finally overflowing into a collecting shoot 9 containing a conveyor worm (not shown) from which it is finally discharged.

The troughs 1 are each provided with paddles or stirrers 8 as previously stated, these paddles or stirrers being mounted upon a hexagonal or other shaft 10 individual to each trough and located in axial relation thereto.

The shafts 10 carrying the paddles or stirrers 8 are preferably provided at their ends with vapour tight glands 11 and are suitably supported on bearings 14 external to the casing of the apparatus and are driven through bevel crown wheels and pinions 12 adapted to be arranged on line shafts 13 supported on bearings fitted on overhung brackets 15 attached to the main framing 16 forming the drier supports. These longitudinal line shafts are provided with chain wheels, which are driven from pinions fixed to a counter shaft which in turn is provided with chain wheels or pulleys for drive from an electric motor or other prime mover, such an arrangement being obvious to one skilled in the art and no further description being deemed necessary.

Where necessary or desirable, the shafts carrying the paddles or stirrers may be hollow to serve for the passage of heating or cooling medium therethrough, or the shafts may be jacketed, or otherwise provided or so formed, as to obtain a similar heating or cooling effect.

Air inlet openings 20 are provided in the side and end walls of the casing for the purpose of regulating the admission of air required to carry away the moisture from the drying material. Outlets 21 are provided at the top of the drier for the removal of the vapour of evaporation, these outlets being connected together into a collecting main 22 which in turn could be connected to the suction of a centrifugal fan or into a ventilating uptake.

In certain cases the admission of fresh air through the inlets 20 would be further controlled by connecting the inlets to a single distributing main, whereby the supply of fresh air could be taken from one central source and where it could be pre-heated or otherwise treated.

The troughs 1 are heated by means of hot gas vapour, or liquid introduced into the jacketed spaces 2 by means of pipe connections 25 and 26 serving the upper and lower tiers respectively, being connected thereto by pipes 27 and 28 having provided cocks 29 and 30 whereby the passage of the hot gas, vapour or liquid may be regulated.

When the material to be treated requires a high evaporating temperature heated oil would be used as the heating medium and would be introduced either through pipes 37 or in certain circumstances through pipes 25 and 26.

The upper part of the jackets 2 are provided with a plurality of air-vent pipes 24 located where shown to provide a ready means for the escape of any air from the jacketed space, each of the air-vent pipes being provided with a stop cock or valve for this purpose.

The piping conveying the heating medium is so arranged that the temperature of the troughs may be controlled and varied. Additional pipe connections are provided for the purpose, when necessary, of circulating cold water or other cooling medium through the jackets, thus allowing the material to be cooled or crystallized before it is discharged from the collecting shoot 9.

These additional pipe connections are provided with multiple way cocks 31, 32, 33 and 34, which will enable the direction of flow of cooling medium through the jackets 2 of the troughs to be reversed and will also permit the two tiers of jackets to be cooled either in parallel or in series. For the series arrangement the cooling medium will normally first pass through the lower tier B and then continue into and through the upper tier A.

Figs. 3 to 6 show how various circuits for cooling water flow through the jackets are effected by suitably operating the multiple way cocks 31, 32, 33, and 34.

Figure 3:
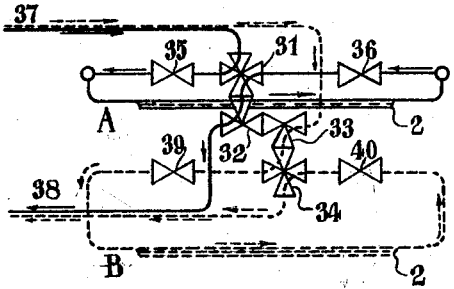

Fig. 3 also shows the passage of the cooling water from the inlet pipe 37 to the upper tier A of the evaporator, and the lower tier B, passing therethrough in parallel, the cooling water to the upper tier A taking the course indicated by the full line, and the cooling water to the lower jacket B taking the course shown by the dotted line, the direction of flow being indicated by arrows.

Figure 4:
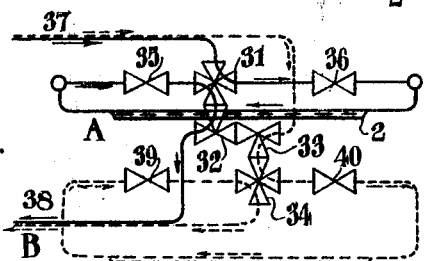

Fig. 4 is also a parallel arrangement of flow, the cooling water passing through the upper tier A as indicated by the full lines and through the lower tier by the dotted lines. In this case, however, it will be noted that the direction of the cooling water or other medium through the jackets is the reverse of that described in Fig. 3.

Fig. 5 shows the arrangement of valves and pipes whereby the cooling water or other medium is passed in series through the jackets of both banks A and B, the cooling water taking the direction of the arrow, while:—

Fig. 6 shows the passage of the cooling water in series through the jackets of both tiers A and B of the evaporator, the direction of flow of the fluid however being the reverse of that shown in Fig. 5.

In operation the material to be treated is fed by hand or bucket elevator into the hopper 3 and passing through the chute 4 and combined seal and distributor 5 enters the first of the series of troughs 1 of the upper tier. In the case where the material is a solution of a crystallizable salt, the paddles or stirrers 8 impart an agitating or churning action on the material whereby it is brought into intimate contact with the heated surface of the troughs 1 and also allows for the rapid elimination of moisture therefrom. The material primarily passes from one trough to another while in its liquid state due to the overflow of the liquid from one trough to another as the material is fed from the hopper 4, but after a certain stage of the treatment has been reached and the material assumes a crystalline form, the material then passes through the apparatus under the action of the stirrers or paddles 8 which then exert a disintegrating effect upon the crystalline masses, whereby caking is avoided and the material reaches the final trough of the series in a uniform and finely divided state.

We wish it to be understood that the above described construction is given by way of illustration only and that the various modifications may be made therein; for example, the arrangement of the troughs in banks or tiers may be varied and also the means employed for feeding the material thereto. Furthermore, the method of conveying the heating or cooling medium to the jackets may also be varied together with the details of construction dependent upon the particular material with which the apparatus is intended to deal.

What we claim and desire to secure by Letters Patent is:—

1. A method of evaporating liquids or crystallizing salts from their solutions comprising passing the material transversely over an undulating surface, and subjecting the material to an agitating or mixing operation in the depressions in said surface during its passage thereover, said agitating and mixing operation imparting transverse movement to said material over said surface.

2. A method of evaporating liquid or crystallizing salts from their solutions comprising passing the material transversely over an undulating surface, subjecting the material to an agitating or mixing operation in the depressions in said surface during its passage thereover, said agitating and mixing operation imparting transverse movement to said material over said surface, and further subjecting the material to the action of a suitable heating or cooling medium in passing over said surface.

3. An apparatus for the evaporation of liquids or crystallization of salts from their solutions comprising a plurality of open-topped troughs located side by side and in abutting relation, and over which the material is adapted to pass in a transverse direction, and means for agitating and mixing the material during its passage through said troughs, said means feeding it over said troughs, throughout their lengths, in a transverse direction.

4. An apparatus for the evaporation of liquids or crystallization of salts from their solutions comprising a plurality of open-topped troughs of arcuate form in cross section located side by side and in abutting relation, and over which the material is adapted to pass in a transverse direction, and means for agitating and mixing the material during its passage through said troughs, said means feeding it over said troughs, throughout their lengths, in a transverse direction.

5. An apparatus for the evaporation of liquid or the crystallization of salts from their solutions comprising a jacket adapted to contain a suitable heating or cooling medium and having one side formed by a plurality of open-topped troughs located side by side in abutting relation, over which the material is adapted to pass in a transverse direction, and means for agitating and mixing the material during its passage through said troughs, said means feeding it over said troughs, throughout their lengths, in a transverse direction.

6. An apparatus for the evaporation of liquid or the crystallization of salts from their solutions comprising a jacket adapted to contain a suitable heating or cooling medium and having one side formed by a plurality of open-topped troughs located side by side in abutting relation, over which the material is adapted to pass in a transverse direction, means for agitating and mixing the material during its passage through said troughs, said means feeding it over said troughs, throughout their lengths, in a transverse direction, and means for governing and controlling the passage of a heating or cooling medium through the jacket.

In testimony whereof we affix our signatures.

RICHARD ALBERT STOKES.
EDWIN GILBERT LLEWELLYN ROBERTS.